United States Patent Office 3,506,667
Patented Apr. 14, 1970

3,506,667
FURO QUINOLINE CARBOXYLATES
Daniel Kaminsky, Parsippany, N.J., assignor to Warner-Lambert Pharmaceutical Company, Morris Plains, N.J., a corporation of Delaware
No Drawing. Continuation-in-part of application Ser. No. 709,166, Feb. 23, 1968. This application May 1, 1969, Ser. No. 821,100
Int. Cl. C07d 33/48
U.S. Cl. 260—287                       14 Claims

ABSTRACT OF THE DISCLOSURE

The present invention relates to quinoline derivatives of the formula:

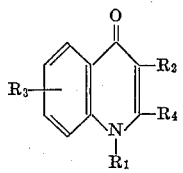

wherein $R_1$ represents hydrogen, lower alkyl, aryl, aralkyl, dialkylamino alkyl, or substituted lower alkyl; $R_2$ represents carboxy, —$COOR_1$, hydrogen,

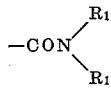

or —$CONHR_1$; $R_3$ represents an oxygen-containing heterocyclic ring system, and in particular, the furan ring system, which may be fused at 5,6-, 6,7-, or 7,8-position of the quinoline nucleus. The heterocyclic ring system may optionally be substituted by one or more of the following groups, for example, lower alkyl, alkoxy, carboxy, carbo lower alkoxy, nitro, aryl, alkylene, i.e.,

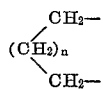

where $n=1$, 2, 3 or 4, and so forth. $R_4$ represents hydrogen, lower alkyl, aryl or aralkyl.

The compounds of this invention are useful as antiviral agents.

This application for United States Letters Patent is a continuation-in-part application of my copending application U.S. Ser. No. 709,166, filed Feb. 23, 1968 and now abandoned.

The present invention relates to quinolines which may be represented by the following structural formula:

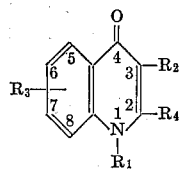

wherein $R_1$ is hydrogen, lower alkyl, aryl, aralkyl, dialkylamino alkyl, or substituted lower alkyl, for example, hydroxy lower alkyl; $R_2$ represents carboxy, —$COOR_1$, hydrogen,

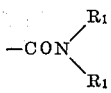

or —$CONHR_1$; $R_3$ represents a 5,6-fused furan heterocyclic ring system, a 6,7-fused furan heterocyclic ring system, or a 7,8-fused furan heterocyclic ring system in which said heterocyclic ring system may optionally be substituted by one or more of the following groups, for example, lower alkoxy, carboxy, carbo lower alkoxy, nitro, lower alkyl, phenyl, phenyl lower alkyl, cycloalkylene having 3–8 carbon atoms, and so forth; and $R_4$ represents hydrogen, lower alkyl, aryl or aralkyl.

In the above definitions for $R_1$, $R_2$, $R_3$, and $R_4$, lower alkyl and the alkyl portion of lower alkoxy and dialkylamino alkyl are meant to include from 1–7 carbon atoms, and aryl is meant to include both mono homocyclic ring systems, such as phenyl, or mono heterocyclic ring systems, such as pyridyl, furyl and the like.

$R_1$, $R_2$, $R_3$ and $R_4$ as used hereinafter have the same meaning as defined above.

The numbering of the quinoline nucleus is as follows:

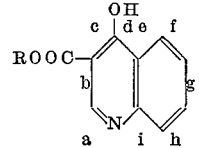

when a furo ring has been fused, the numbering is as follows:

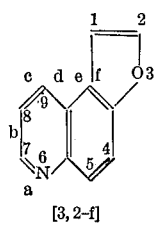 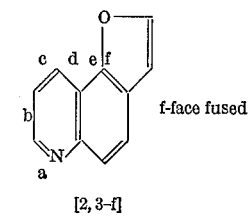

[3,2-f]             [2,3-f]   f-face fused

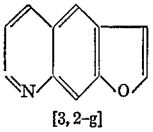

[3,2-g]             [2,3-g]   g-face fused

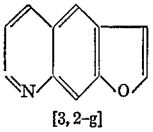

[2,3-h]             [3,2-h]   h-face fused

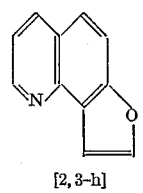

The compounds of this invention are useful as antimicrobial agents, typically against certain respiratory viruses, foot and mouth viruses, and gram negative bacilli, notably the Proteus group. These compounds, when incubated in tissue culture containing viruses, such as rhinovirus, ECHO virus and para-influenza virus, which are viruses commonly associated with respiratory diseases, can inhibit their propagation at a concentration as low as $2\mu$ grams per ml. A more detailed protocol as to this virucidal activity is described below.

In order to use these compounds to halt viral infections caused by susceptible viruses or caused by Proteus in a mammalian host such as guinea pigs, mice, cats, dogs, livestock, and the like, they are administered at a dose of about 10 mg. to 2 grams per 70 kg. of body weight, three or four times daily. This dosage regimen is dependent upon the severity of the infection being treated, and may be varied within the range specified by methods well known to the healing arts. These compounds may be administered orally or by parenteral injection within the dose range as described. In order to administer these compounds, they are combined with known pharmaceutical excipients, for example, lactose, mannitol, starch, dicalcium phosphate, to form dosage forms such as tablets, powders and the like. They may also be combined with parenterally acceptable vehicles, such as water, saline and the like, to form dosage forms suitable for injection.

For topical application against Proteus infection, the compounds may be combined with a carrier such as talc or vaseline with the active ingredients being present from 1 to 50% by weight.

In order to enhance the therapeutic spectrum of these compounds, they may also be combined with other known chemotherapeutic agents, such as the sulfur drugs, the penicillins and the tetracyclines.

Because these compounds have an extremely low toxicity, that is, when tested in mice they exhibit an oral $LD_{50}$ of greater than 1,000 mg. per kg., this, coupled with an extreme potency, makes them a unique class of agents to combat viral infections.

According to this invention, the novel compounds of this invention are prepared by condensing amino compound of Type I

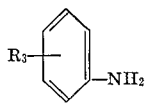

(I)

with diethyl ethoxymethylene malonate or a diethyl acyl malonate to form compounds of Type II.

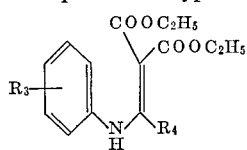

(II)

Cyclization of compounds of Type II may be effected by heating in a suitable inert heat transfer medium, such as a eutectic mixture of diphenyl ether and biphenyl, to a temperature of about 190° to 290° C., resulting in a cyclized product of Type III.

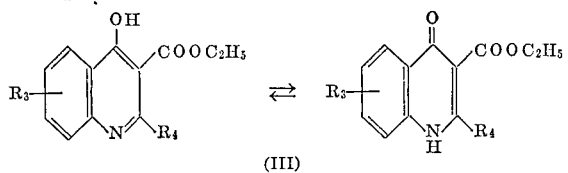

(III)

Alkylation (or aralkylation etc.) of compounds of Type III may be carried out by the general procedure outlined in U.S. Patent No. 3,287,458 or by other standard methods to yield N—$R_1$ substituted compounds of Type IV.

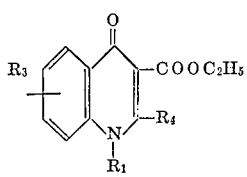

(IV)

Acid or basic hydrolysis of esters of Type IV give the corresponding free acids of Type V.

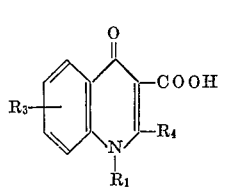

(V)

Decarboxylation is effected by heating the free acids at or above their melting points, with or without a solvent or catalyst (i.e., Cu powder, powdered glass, etc.). This yields the compounds of Type VI.

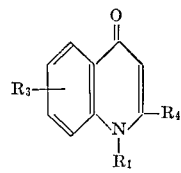

(VI)

Treatment of the acids of Type V with halogenating agents converts them to the corresponding acid halides, and subsequent treatment of said acid halides with amines or alcohols gives compounds of Type VII, wherein $R_2$ is —$COOR_1$,

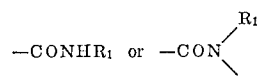

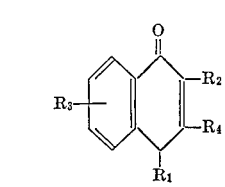

(VII)

The starting amino substituted benzofurans are readily available by reduction of nitro benzofurans prepared by, for example, utilizing the general methods of:

(1) H. Erlenmeyer et al., Helv. Chim. Acta 31, 75 (1948)
(2) U.S. patent application No. 621,156 (Warner-Lambert)
(3) S. Tanaka, J. Am. Chem. Soc. 73, 872 (1951)
(4) S. Tanaka, J. Chem. Soc. Japan, Pure Chem. Sect. 73, 282 (1952)
(5) P. Rumpf and G. Gansser, Helv. Chim. Acta 37, 435 (1954)

or by nitration of commercially available benzofurans.

The following examples are meant to illustrate the general procedure for the preparation of quinolines substituted in the benzenoid ring by a heterocyclic moiety.

EXAMPLE 1

Diethyl[(benzofuran-5-ylamino)methylene]malonate

A mixture of 34 grams of 5-nitrobenzofuran, 0.5 of platinum oxide and 300 ml. of isopropyl alcohol was shaken in a Parr apparatus with hydrogen until the theoretical amount of hydrogen was absorbed. The mixture was filtered and an equimolar amount (44 g.) of diethyl ethoxy-methylene malonate was added to the filtrate. The solution was stripped of solvent at about 90°/15 mm. and the residue heated three hours on a steam bath. Recrystallizations of the residual oil from Skellysolve B (Petroleum ether, B.P. 60–90°) yielded 45–55 grams of diethyl[(benzofuran-5-ylamino)methylene]malonate, M.P. 61–63° C. An analytical pure sample recrystallized from Skellysolve B melted at 63–65° C.

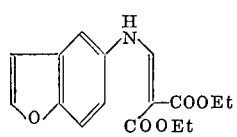

EXAMPLE 1A

Diethyl[(benzofuran-7-ylamino)methylene]malonate

Following the procedure in Example 1 and using 5 grams of 7-nitrobenzofuran (instead of 5-nitrobenzofuran), there was obtained 8.2 grams of diethyl[(benzofuran-7-ylamino)methylene]malonate, M.P. 98–102° C.

The analytical sample from Skellysolve B melted at 103–104° C.

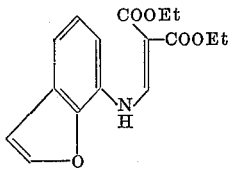

EXAMPLE 2

Ethyl 9-hydroxyfuro[3,2-f]quinoline-8-carboxylate

A mixture of 42 grams of diethyl[(benzofuran-5-ylamino)methylene]malonate and 420 ml. of Dowtherm A (eutectic mixture of diphenyl ether and biphenyl) or diphenyl ether is refluxed with stirring for ½ hr. The mixture is cooled to room temperature, diluted with about 500 ml. Skellysolve B and filtered to yield 28–35 grams of ethyl 9-hydroxyfuro[3,2-f]quinoline-8-carboxylate, M.P. 277–283° C. Recrystallization from dimethylformamide gives analytical material melting at 297–298° C.

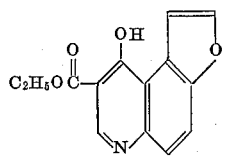

EXAMPLE 2A

Ethyl 6-hydroxyfuro[3,2-h]quinoline-7-carboxylate

Following the procedure in Example 2 and using 7 grams of diethyl[(benzofuran - 7 - ylamino)methylene]malonate, there was obtained 5–6 grams of ethyl 6-hydroxyfuro[3,2-h]quinoline - 7 - carboxylate, M.P. 226–229° C.

The analytical material from ethanol melted at 231–233° C.

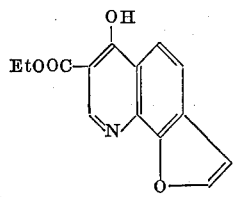

EXAMPLE 3

Ethyl 6,9-dihydro-6-methyl-9-oxofuro[3,2-f]quinoline-8-carboxylate

A mixture of 10.3 g. of ethyl 9-hydroxyfuro[3,2-f]quinoline-8-carboxylate, 300 ml. of 95% ethanol, 100 ml. of water, 6 g. of sodium hydroxide and 12.6 g. of dimethyl sulfate was stirred at 10–15° C. for 6 hrs. The alcohol was removed under vacuum (about 20–30°/1–2 mm.) and the residue cooled and filtered to yield 8–10 g. of ethyl 6,9-dihydro-6-methyl-9-oxofuro[3,2-f]quinoline-8-carboxylate, M.P. 222–228° C. The analytical sample from acetone melted at 230–231° C.

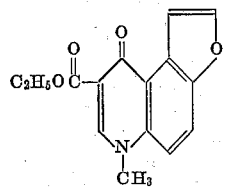

EXAMPLE 4

6,9-dihydro-6-methyl-9-oxofuro[3,2-f]quinoline-8-carboxylic acid

A mixture of 5 g. of ethyl 6,9-dihydro-6-methyl-9-oxofuro[3,2-f]quinoline-8-carboxylate and 200 ml. of 5% aqueous sodium hydroxide is refluxed for 6 hrs., filtered hot and the filtrate acidified with conc. hydrochloric acid to yield 3–4 g. of 6,9-dihydro-6-methyl-9-oxofuro[3,2-f]quinoline-8-carboxylic acid, M.P. 317–320° C. (decomposes). The analytical sample from dimethylformamide melted at 319–321° C. with decomposition.

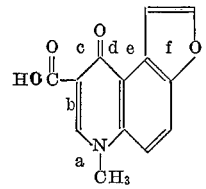

EXAMPLE 5

9-hydroxyfuro[3,2-f]quinoline-8-carboxylic acid

Following the procedure in Example 4 and using 3 grams of ethyl 9-hydroxyfuro[3,2-f]quinoline - 8 - carboxylate, there is obtained 2.4–2.6 grams of 9-hydroxyfuro[3,2-f₅]quinoline-8-carboxylic acid, M.P. 261–265° C. (decomposes). The analytical material from dimethylformamide melted at 267–268° C. with decomposition.

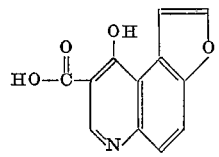

EXAMPLE 6

Diethyl ({[2-ethoxycarbonyl)benzofuran-5-yl]amino}methylene)malonate

Following the procedure in Example 1 and using 23.5 grams of ethyl 5-nitrobenzofuran-2-carboxylate (instead of 5-nitrobenzofuran), there was obtained 38–40 grams of diethyl ({[2-(ethoxycarbonyl)benzofuran-5-yl]-amino} methylene) malonate, M.P. 132–135° C. The analytical sample from Skellysolve B melted at 137–139° C.

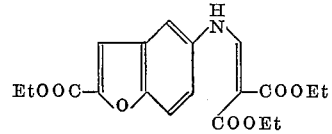

EXAMPLE 7

Diethyl 9-hydroxyfuro[3,2-f]quinoline-2,8-dicarboxylate

Following the procedure in Example 2 and using 28 grams of diethyl ({[2-(ethoxycarbonyl)benzenofuran-5-yl]amino}methylene) malonate, there was obtained 16–24 grams of diethyl 9-hydroxyfuro[3,2-f]quinoline-2,8-dicarboxylate, M.P. 268–271° C. (dec.). The analytical material from dimethylformamide melted at 271–273° C. with decomposition.

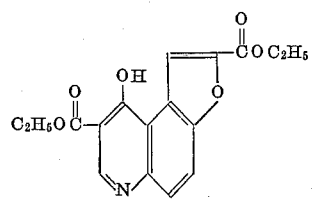

EXAMPLE 8

9-hydroxyfuro[3,2-f]quinoline-2,8-dicarboxylic acid

Following the procedure in Example 4 and using 3.5 grams of diethyl 9-hydroxyfuro[3,2-f]quinoline-2,8-dicarboxylate (instead of ethyl 6,9-dihydro-6-methyl-9-oxofuro[3,2-f]quinoline-8-carboxylate), there was obtained 2.6–3.2 grams of 9-hydroxyfuro[3,2-f]quinoline-2,8-dicarboxylic acid, M.P. 294–297° C. (decomposes). The analytical sample from aqueous dimethylformamide melted at 298–300° C. with decomposition.

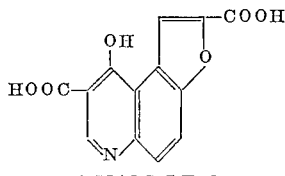

EXAMPLE 9

6,9-dihydro-6-methyl-9-oxofuro[3,2-f]quinoline-2,8-dicarboxylic acid

Following the procedure in Example 3 and using 10 grams of 9-hydroxyfuro[3,2-f]quinoline-2,8-dicarboxylic acid (instead of ethyl 9-hydroxyfuro[3,2-f]quinoline-8-carboxylate), there was obtained 6.7–8.3 grams of 6,9-dihydro-6-methyl-9-oxofuro[3,2-f]quinoline - 2,8 - dicarboxylic acid, M.P. 312–316° C. (decomposes). The analytical sample from aqueous dimethylformamide melted at 317–319° C. with decomposition.

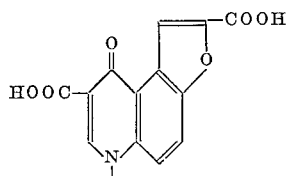

EXAMPLE 10

Diethyl({[1,2,3,4-tetrahydro-dibenzofuran-8-yl]amino}methylene)malonate

Following the procedure in Example 1 and using 21.7 grams of 8-nitro-1,2,3,4-tetrahydrodibenzofuran (instead of 5-nitrobenzofuran), there is obtained 28–34 grams of diethyl ({[1,2,3,4-tetrahydro-dibenzofuran-8-yl]amino}methylene)malonate, M.P. 94–101° C. Recrystallizations from Skellysolve B give the analytical material melting at 102–103° C.

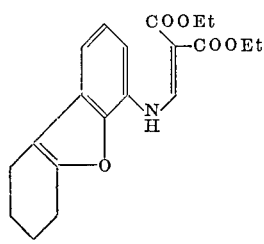

EXAMPLE 11

Ethyl 7,8,9,10-tetrahydro-4-hydroxybenzofuro[3,2-h]quinoline-3-carboxylate

Following the procedure in Example 2 and using 21 grams of diethyl ({[1,2,3,4-tetrahydrodibenzofuran-8-yl]amino}methylene)malonate (instead of diethyl[(benzofuran-5-ylamino)methylene]malonate), there is obtained 14–18 grams of ethyl 7,8,9,10-tetrahydro-4-hydroxybenzofuro[3,2-h]quinoline - 3 - carboxylate, M.P. 261–265° C. (decomposes). The analytical material from dimethylformamide melted at 266–267° C. with decomposition.

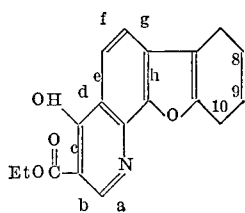

EXAMPLE 12

Diethyl({[2-methylbenzofuran-5-yl]amino}methylene)malonate

Following the procedure in Example 1 and using 28.5 grams of 5-nitro-2-methylbenzofuran (instead of 5-nitrobenzofuran), there is obtained 44–47 grams of diethyl-({[2-methylbenzofuran - 5 - yl]amino}methylene)malonate, M.P. 72–75° C. Recrystallization from Skellysolve B: ethanol (1:1) gave the analytical material, melting at 75–76° C.

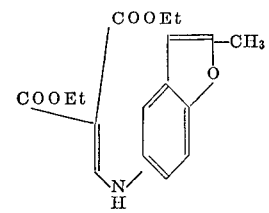

EXAMPLE 13

Ethyl 9-hydroxy-2-methylfuro[3,2-f]quinoline-8-carboxylate

Following the procedure in Example 2 and using 36 grams of diethyl[(2-methylbenzofuran-5-ylamino)methylene]malonate (instead of diethyl[(benzofuran-5-ylamino)methylene]malonate), there was obtained 23–25 grams of ethyl 9 - hydroxy - 2-methylfuro[3,2-f]quinoline-8-carboxylate, M.P. 269–276° C. The analytical material from dimethylformamide melted at 278–280° C.

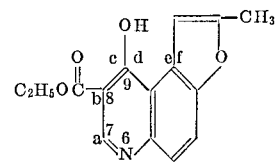

EXAMPLE 14

9-hydroxy-2-methylfuro[3,2-f]quinoline-8-carboxylic acid

Following the procedure in Example 4 and using 5 grams of ethyl 9-hydroxy-2-methylfuro[3,2-f]quinoline-8-carboxylate (instead of ethyl 6,9-dihydro-6-methyl-9-oxofuro[3,2-f]quinoline-8-carboxylate), there was obtained 3.6–4.1 grams of 9-hydroxy-2-methylfuro[3,2-f]quinoline-8-carboxylic acid, M.P. 288–289° C. (decomposes). The analytical material from dimethylformamide melted at 291–292° C. with decomposition.

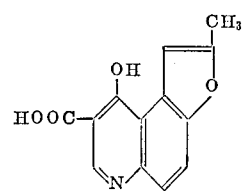

EXAMPLE 15

Ethyl 9-hydroxyfuro[2,3-f]quinoline-8-carboxylate and ethyl 8-hydroxyfuro[3,2-g]quinoline-7-carboxylate Following the procedure as described in Example 1 and using 22 grams of 6-nitrobenzofuran (instead of 5-nitrobenzofuran), there is obtained 40–44 grams of diethyl[(benzofuran - 6 - ylamino)methylene]malonate as a non-distillable oil (pure by analysis and spectra).

Then following the procedure as described in Example 2, and using 37 grams of the above oil, there was obtained 22–25 grams of a mixture of equal parts (by NMR spectroscopy) of ethyl 9-hydroxyfuro[2,3-f]quinoline-8-carboxylate and ethyl 8-hydroxyfuro[3,2-g]quinoline-7-carboxylate. Recrystallization from aqueous dimethylformamide gave an analytically pure mixture of equal parts of the two isomeric esters, M.P. 258–260° C. (dec.)

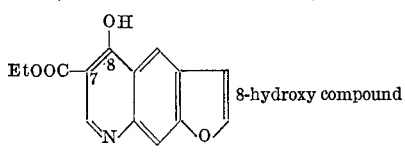

8-hydroxy compound

EXAMPLE 16

The following is the anti-viral profile of the compound of Example 4, which is a typical anti-viral profile of all the compounds of this invention.

Two types of tissue culture were used, primary monkey kidney and primary embryonic kidney in monolayers. These tissue cultures were then inoculated with rhinoviruses types 1A and 30. The inoculum was 0.2 ml. of a 1:10 dilution of these viruses, which was approximately equal to 1000 tissue culture infectious dose 50. The drug was added to these tissue cultures at the same time when they were inoculated with the respective viruses.

The inoculated tubes were then incubated at approximately 37° C., after which the tubes were well inspected microscopically for the degree of cytopathic effects on a 1 to 4 scale. A beneficial effect from the drug was judged to have occurred if the difference in cytopathic effect of the treated and controlled cultures was greater than 1.5.

The compound of Example 4 was found to be active at about 5 μg./ml.

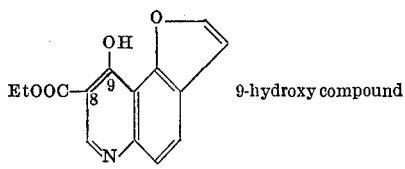

9-hydroxy compound

I claim:
1. A compound of the formula:

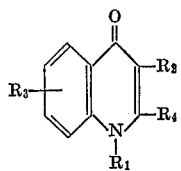

wherein $R_1$ is hydrogen, lower alkyl, phenyl, phenyl lower alkyl, or hydroxy lower alkyl; $R_2$ is carboxy, —$COOR_1$, hydrogen,

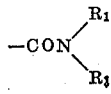

or —$CONHR_1$; $R_3$ is a 5,6-fused furo, a 6,7-fused furo, or a 7,8-fused furo in which said furo may also be substituted by carboxy, carbo lower alkoxy, nitro, lower alkyl, phenyl, phenyl lower alkyl or cycloalkylene having 3–8 carbon atoms; and $R_4$ is hydrogen, lower alkyl, phenyl or phenyl lower alkyl.

2. A compound according to claim 1 which is ethyl 9-hydroxyfuro[3,2-f]quinoline-8-carboxylate.

3. A compound according to claim 1 which is ethyl 6,9-dihydro-6-methyl-9-oxofuro[3,2-f]quinoline - 8 - carboxylate.

4. A compound according to claim 1 which is 6,9-dihydro-6-methyl-9-oxofuro[3,2-f]quinoline - 8 - carboxylic acid.

5. A compound according to claim 1 which is 9-hydroxyfuro[3,2-f]quinoline-8-carboxylic acid.

6. A compound according to claim 1 which is diethyl 9-hydroxyfuro[3,2-f]quinoline-2,8-dicarboxylate.

7. A compound according to claim 1 which is 9-hydroxyfuro[3,2-f]quinoline-2,8-dicarboxylic acid.

8. A compound according to claim 1 which is 6,9-dihydro-6-methyl-9-oxofuro[3,2-f]quinoline - 2,8 - dicarboxylic acid.

9. A compound according to claim 1 which is ethyl 7,8,9,10 - tetrahydro - 4 - hydroxybenzofuro[3,2-h]quinoline-3-carboxylate.

10. A compound according to claim 1 which is ethyl 9-hydroxy-2-methylfuro[3,2-f]quinoline-8-carboxylate.

11. A compound according to claim 1 which is 9-hydroxy-2-methylfuro[3,2-f]quinoline-8-carboxylic acid.

12. A compound according to claim 1 which is ethyl 6-hydroxyfuro[3,2-h]quinoline-7-carboxylate.

13. A compound according to claim 1 which is ethyl 9-hydroxyfuro[2,3-f]quinoline-8-carboxylate.

14. A compound according to claim 1 which is ethyl 8-hydroxyfuro[3,2-g]quinoline-7-carboxylate.

References Cited

UNITED STATES PATENTS

| | | | |
|---|---|---|---|
| 3,172,811 | 3/1965 | Kaminsky et al. | 260—287 X |
| 3,287,458 | 11/1966 | Kaminsky et al. | 260—287 |
| 3,313,818 | 4/1967 | Lesher | 260—287 |

OTHER REFERENCES

Rene et al., Abstracted in Chem. Abstr., vol. 64, col. 19580-1 (1966).

DONALD G. PAUS, Primary Examiner

U.S. Cl. X.R.

260—289, 346.2; 424—258